US006030261A

United States Patent [19]

Motose

[11] Patent Number: 6,030,261

[45] Date of Patent: Feb. 29, 2000

[54] ENGINE CONTROL

[75] Inventor: Hitoshi Motose, Hamamatsu, Japan

[73] Assignee: Sanshin Kogyo Kabushiki Kaisha, Hamamatsu, Japan

[21] Appl. No.: 09/032,584

[22] Filed: Feb. 27, 1998

[30] Foreign Application Priority Data

Feb. 27, 1997 [JP] Japan .................................... 9-043266

[51] Int. Cl.[7] ...................................................... B60K 41/00

[52] U.S. Cl. .................................. 440/84; 440/1; 440/89; 123/478

[58] Field of Search .................................. 440/1, 89, 88, 440/84; 123/478, 681, 418

[56] References Cited

U.S. PATENT DOCUMENTS 5,222,022 6/1993 Adams et al. .......................... 123/418
5,433,634 7/1995 Nakayama et al. .......................... 440/1

*Primary Examiner*—Jesus D. Sotelo
*Attorney, Agent, or Firm*—Knobbe, Martens, Olson & Bear LLP

[57] ABSTRACT

A control for a propulsion unit for a watercraft, the unit powered by an internal combustion engine, is disclosed. At least one sensor is associated with the propulsion unit for providing data regarding a condition of the propulsion unit. The control includes a memory for storing sensor data, an input accepting data from the sensor(s) and storing the data in the memory, and an output for reading data from the memory. The memory has a first data position and a last data position. The control is arranged to store data obtained from the sensor(s) through the input sequentially to the first and through the last data position and to then repeat the sequence of storing back at the first position after the last data position is filled.

12 Claims, 5 Drawing Sheets

ENGINE CONTROL

FIELD OF THE INVENTION

The present invention relates to an engine control. In particular, the present invention is a control having a memory to which operational information is stored and from which it is read.

BACKGROUND OF THE INVENTION

Outboard motors include a water propulsion device which is often powered by an internal combustion engine. In recent years, a variety of apparatus has been employed in order to improve the operating efficiency of these engines.

For example, oxygen sensors are now commonly used to measure the air/fuel ratio of the air and fuel mixture supplied to the engine. The output from the sensor is utilized to adjust the amount of air and fuel supplied to the engine at a given condition so that the engine runs smooth and the emission content is improved.

A wide variety of other sensors are also used. For example, temperature sensors measure the engine and/or coolant temperature. If the temperature of the engine becomes too high, a warning light may illuminate. Fuel and oil level sensors may be provided, along with speed, motor position and the other sensors.

The output of all of these sensors is generally provided to the memory of a processing unit. In order for the processing unit to analyze changes in the data over a length of time, an extremely large memory is required to store the data from all of the sensors over a period of time. For example, storing only one or two data set from a temperature sensor may result in a false indication of engine overheating when only a small temperature spike is being experienced. Thus, it is generally desirable to store the information provided from each of the sensors over a period of time so that the information may be compared.

In the past, a very large memory has been utilized in order to store the data from the many sensors over the long period of time. This, however, increases the cost associated with the motor.

It is an object of the present invention to provide an improved control for an engine of the type used to power an outboard motor.

SUMMARY OF THE INVENTION

The present invention is a control for an engine of a propulsion unit for a watercraft. Preferably, the propulsion unit is an outboard motor having a water propulsion device powered by the internal combustion engine. At least one sensor is associated with the propulsion unit for providing data regarding a condition of the propulsion unit.

The control includes a memory for storing sensor data, an input accepting data from the sensor(s) and storing the data in the memory, and an output for reading data from the memory. The memory has a first data position and a last data position. The control is arranged to store data obtained from the sensor(s) through the input sequentially to the first and through the last data position and to then repeat the sequence of storing back at the first position after the last data position is filled.

In a preferred embodiment, the control includes an abnormal condition data memory and is arranged to detect an abnormal condition of the propulsion unit. When such a condition is detected, the control is arranged to transfer data received through the input to the abnormal memory.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

Figure 1:
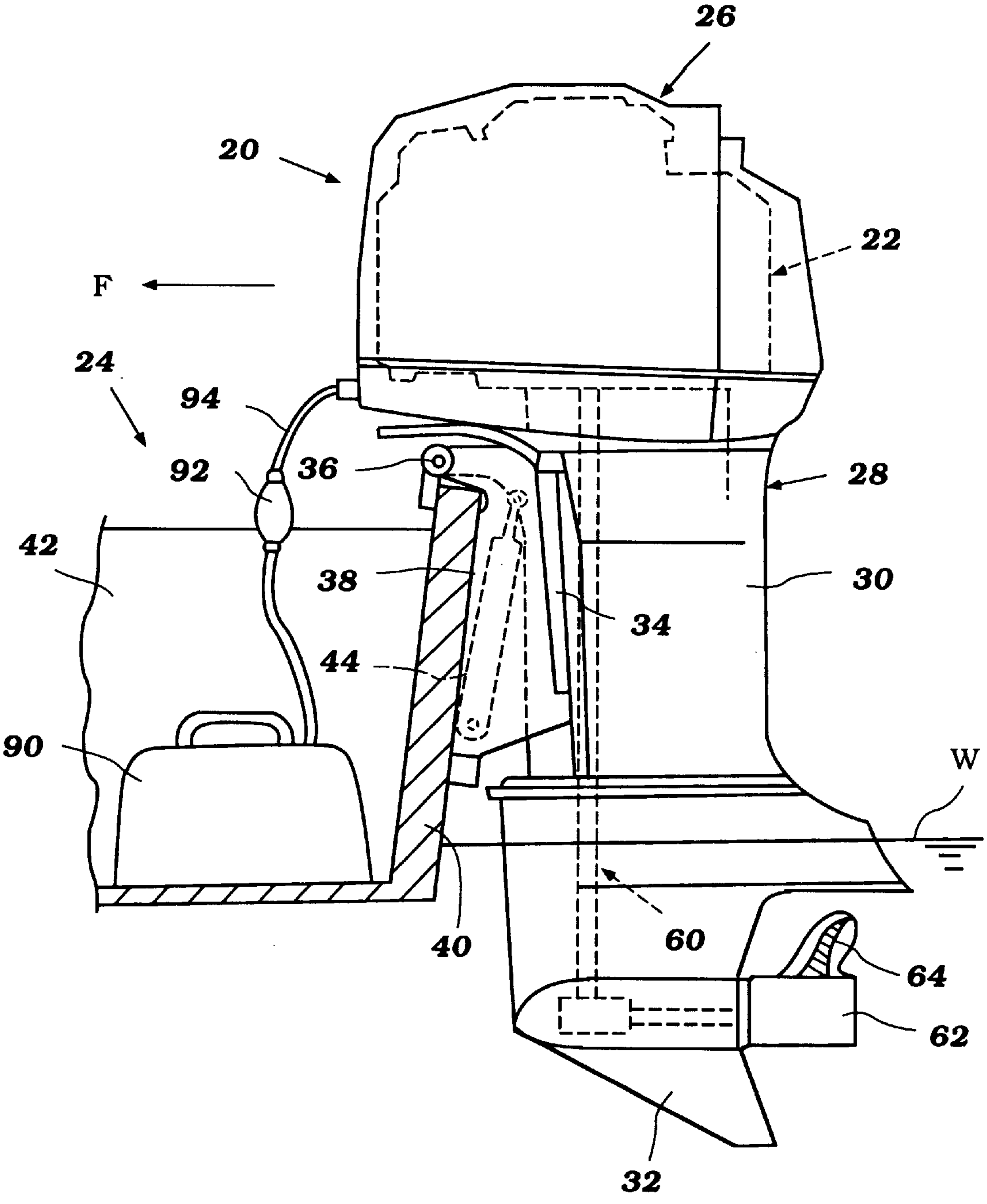
FIG. 1 is a side view of an outboard motor connected to a watercraft, illustrated partially and in cross-section, the motor powered by an engine positioned in a cowling and having an engine control in accordance with the present invention.

Referring first to FIG. 1, in accordance with the present invention, there is provided a control for an engine associated with a propulsion unit of a watercraft. The control preferably includes a memory to which operational information is stored and from which the information is read. Preferably, the control is arranged to detect an abnormality and transfer the abnormal operational information to a separate memory storage area.

As best illustrated in FIG. 1, the propulsion unit is an outboard motor 20 utilized to power a watercraft 24 positioned in a body of water W. The outboard motor 20 has a powerhead defined by a main cowling 26. The motor 20 includes a lower unit 28 extending downwardly therefrom, the lower unit 34 comprising an upper or “drive shaft housing” section 30 and a lower section 32.

A steering shaft, not shown, is affixed to the motor 20, preferably by means of a pair of vibration isolating mounts. The steering shaft is supported for steering movement about a vertically extending axis within a swivel bracket 34. The swivel bracket 34 is connected by means of a pivot pin 36 to a clamping bracket 38 which is attached to a transom portion 40 of a hull 42 of the watercraft 24 (and faces in a direction to the front or Fr of the watercraft). The pivot pin 36 permits the outboard motor 20 to be trimmed and tilted up about the horizontally disposed axis formed by the pivot pin 36, preferably with the aid of a hydraulic cylinder 44.

Figure 2:
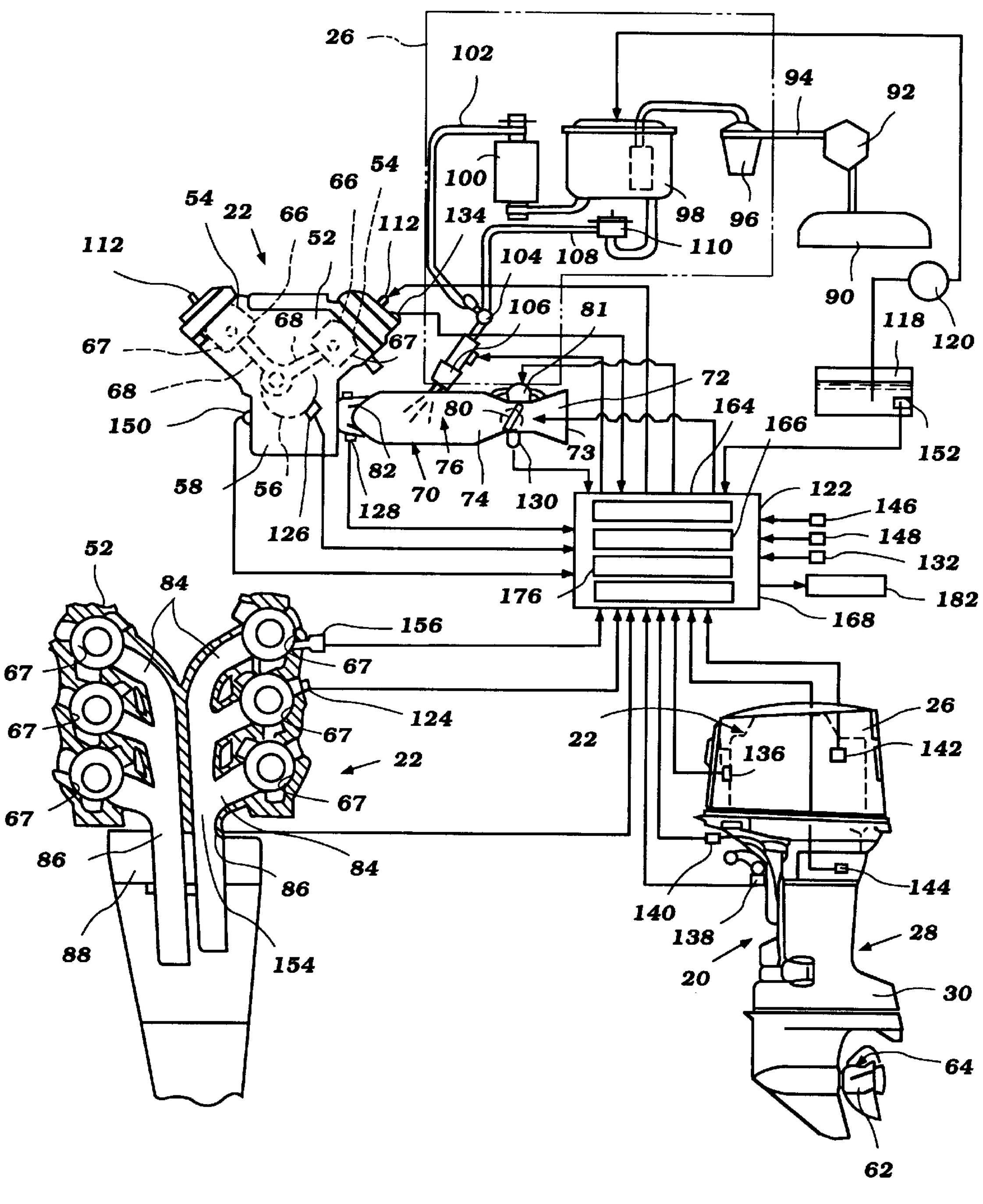
FIG. 2 is a schematic illustrating the interrelationship between the engine and outboard motor illustrated in FIG. 1, various sensors for the engine and the motor, and the control of the present invention.

As best illustrated in FIG. 2, the powerhead of the outboard motor 20 includes an engine 22 which is positioned within the main cowling 26. In the embodiment of the present invention, the engine 22 is preferably of the “V”-type, having a pair of cylinder banks with at least one cylinder per bank, and operating on a two-cycle principle.

The engine 22 includes a cylinder block 52 which has first and second cylinder banks closed by first and second cylinder head assemblies 54. A crankshaft 56 is rotatably journalled in a crankcase chamber formed by the cylinder block 52 a crankcase cover 58. As is typical with outboard motor practice, and referring to FIG. 1, the engine 22 is mounted in the cowling 26 so that the crankshaft 56 rotates about a vertically extending axis.

Referring to FIG. 1, a lower end of the crankshaft 56 drives a drive shaft 60 which depends into the lower unit 34, wherein it drives a bevel gear and a conventional forward-neutral-reverse transmission. The transmission is not illustrated herein, because its construction per se forms no part of the invention. Therefore, any known type of transmission may be employed.

The engine selectively drives a propeller shaft through the transmission, the propeller shaft journalled within the lower section 40 of the lower unit 34 in a known manner. A hub 62 a propeller 64 is coupled to the propeller shaft for providing a propulsive force to the watercraft 24 in a manner well known in this art.

The construction of the engine 22 will now be described in more detail. As illustrated in FIG. 2, the cylinder block 52 cooperates with each cylinder head 54 to define a number of variable volume combustion chambers 67, preferably at least one per cylinder bank. It should be understood that there may be more than one combustion chamber per bank. Each combustion chamber has a piston 66 mounted therein for reciprocation, the piston connected to the crankshaft 56 via a connecting rod 68.

As illustrated in FIG. 2, an intake system 70 provides air to each combustion chamber. The intake system 70 includes an intake port 72 in an air intake 73 positioned within the cowling 26. Air drawn through this intake 73 passes into an air passage 74 of an intake pipe 76.

A throttle 80 is provided for controlling the flow of air through the intake pipe 76 to the combustion chambers 67. Preferably, the throttle 80 comprises a moveable plate positioned in a throttle body portion of the intake pipe 76. The throttle 80 is preferably controlled through a cable or similar element remotely by the operator of the watercraft 24.

As illustrated, an at idle air bypass 81 is provided. This bypass 81 comprises a small passage which leads from upstream of the throttle valve 80 to downstream thereof. The bypass 81 is arranged to permit air to flow to the engine 22 even when the throttle valve 80 is closed at an idle position.

Means are provided for controlling the passage of air through the intake pipe 80 to a crankcase chamber. Preferably, this means comprises a reed valve 82. Preferably, a reed valve 82 controls the flow of air into a crankcase compression chamber corresponding to each cylinder or combustion chamber. As is well known in the art of two-cycle engines, the crankcase is thus divided into individual chambers. As a particular piston 66 moves downwardly, the air in a corresponding crankcase chamber is compressed (the reed valve 82 preventing the reverse flow of air into the intake pipe 76) and then flows through a scavenge passage (not shown) into the combustion chamber above the piston 66. As the piston 66 moves up, air is drawn through the reed valve 82 into the crankcase.

As the piston 66 moves, exhaust is also flushed from the combustion chamber. An exhaust system is provided for routing the products of combustion within the combustion chamber 67 to a point external to the engine 22. In particular, an exhaust passage 84 corresponding to the cylinders of each bank leads to a main passage 86 in an exhaust manifold portion of the engine 22. The remainder of the exhaust system will be described in more detail below. The exhaust is then preferably routed through a pair of corresponding exhaust passages in an exhaust guide 88 below the engine 22 and then into a muffler. Although not shown, the exhaust is then routed to an appropriate discharge, such as an above-the water or through the propeller hub discharge as known to those of skill in the art.

Means may be provided for controlling the timing of the flow of exhaust from each combustion chamber 67. Though not illustrated, this means may comprise a sliding-knife, rotating or other type valve which may be moved into a variety of positions, such as one in which the valve obscures little if any of the exhaust passage to one in which the valve obscures some but not all of the exhaust passage.

A fuel delivery system is provided for delivering fuel to each combustion chamber 59 for combustion therein. As illustrated in FIG. 1, the fuel delivery system preferably includes a fuel tank 90 positioned within the watercraft 24. Fuel is drawn from the fuel tank 90 by a low pressure fuel pump 92 through a supply line 94.

Referring now to FIG. 2, the supply line 94 extends to a fuel filter 96 and thereon to a chamber of a vapor separator 98. In the vapor separator 98, vapor is relieved, and fuel is drawn from the chamber of the separator by a high pressure pump 100. Fuel under high pressure is delivered by the pump 100 through a high pressure fuel line 102 to a fuel rail 104. Fuel is delivered through the rail 104 to a fuel injector 106 corresponding to each rail 104. Fuel is delivered through the fuel rail 104 to at least one fuel injector 106. As illustrated, the fuel injector 106 is arranged to deliver fuel into the air passing through the intake pipe 74.

Fuel supplied by the fuel rail 104 but which is not delivered by the injectors 106 is routed through a return line 108 through a pressure regulator 110 back into the chamber of the vapor separator 98 for pumping fuel from the tank and delivering it to each combustion chamber 59.

A suitable ignition system is provided for igniting an air and fuel mixture within each combustion chamber 59. Preferably, the ignition system includes a spark plug 112 corresponding to each combustion chamber 67 and a suitable electric charging system. Such systems are well known to those skilled in the art.

The engine 22 includes a lubricating system for providing lubricant such as oil to the engine. Preferably, the lubricant is supplied into the fuel and delivered to the engine in a fuel/oil mixture. The lubricating system includes an oil reservoir 118 and a pump 120 arranged to deliver oil from the reservoir 118 to the vapor separator 98 where it is mixed with the fuel and delivered to the engine 22 through the fuel injector 106.

The motor 20 preferably includes a liquid cooling system for cooling various components thereof, including the engine 22. Such cooling systems are well known to those skilled in the art.

In accordance with the present invention, the motor 20 preferably includes a control. Preferably, the control includes an electronic control unit (ECU) 122. This ECU 122 receives information from a variety of sensors, and utilizes this information to control a number of engine/motor features.

Preferably, the ECU 122 receives data from an engine temperature sensor 124, a crankshaft rotational position sensor 126, an intake air temperature sensor 128, a throttle position sensor 130, an ambient air pressure sensor 132, a combustion chamber pressure sensor 134, an engine vibration sensor 136, a motor trim position sensor 138, a motor to watercraft mount height sensor 140, a cooling water temperature sensor 142, a transmission position sensor 144, a watercraft speed sensor 146, a watercraft posture sensor 148, a crankcase pressure sensor 150, an oil reservoir oil level sensor 152, an exhaust gas back pressure sensor 154, and a combustion condition sensor 156.

Generally, these sensors are arranged to provide an output signal which is readable by the ECU 122. For example, the output of the various sensors may be in the form of a voltage, where the magnitude of the voltage corresponds to a particular data value, such as throttle angle, engine temperature or the like.

Preferably, the combustion condition sensor comprises an oxygen ($O_2$) sensor such as that type including a platinum-plated glass tube having a hollow center and an electrical heater extending into the hollow center, the heater communication with a control unit through a shielded conductor. The sensor 156 may be arranged in other manners, however, as known to those skilled in the art.

The sensor 156 is arranged to be in communication with exhaust gas generated by the engine 22. In this manner, the sensor 156 provides an output signal indicative of the oxygen content of the exhaust gas, and thus provides an indicator of the fuel/air ratio of the charge supplied to the engine. As illustrated, at least one sensor 156 is mounted so that its sensing portion is in communication with one of the combustion chambers 67.

The ECU 122 utilizes the data from the various sensors to control various engine or propulsion unit operating features. For example, the ECU 122 controls the timing of the firing of spark plugs 112. The ECU 122 also controls the fuel injector 106 thus controlling the amount of fuel delivered to the engine, and thus the ratio of the air/fuel charge. In this manner, the ECU 122 ensures that the engine is operating at the correct operating parameters for a given condition.

Figure 3:
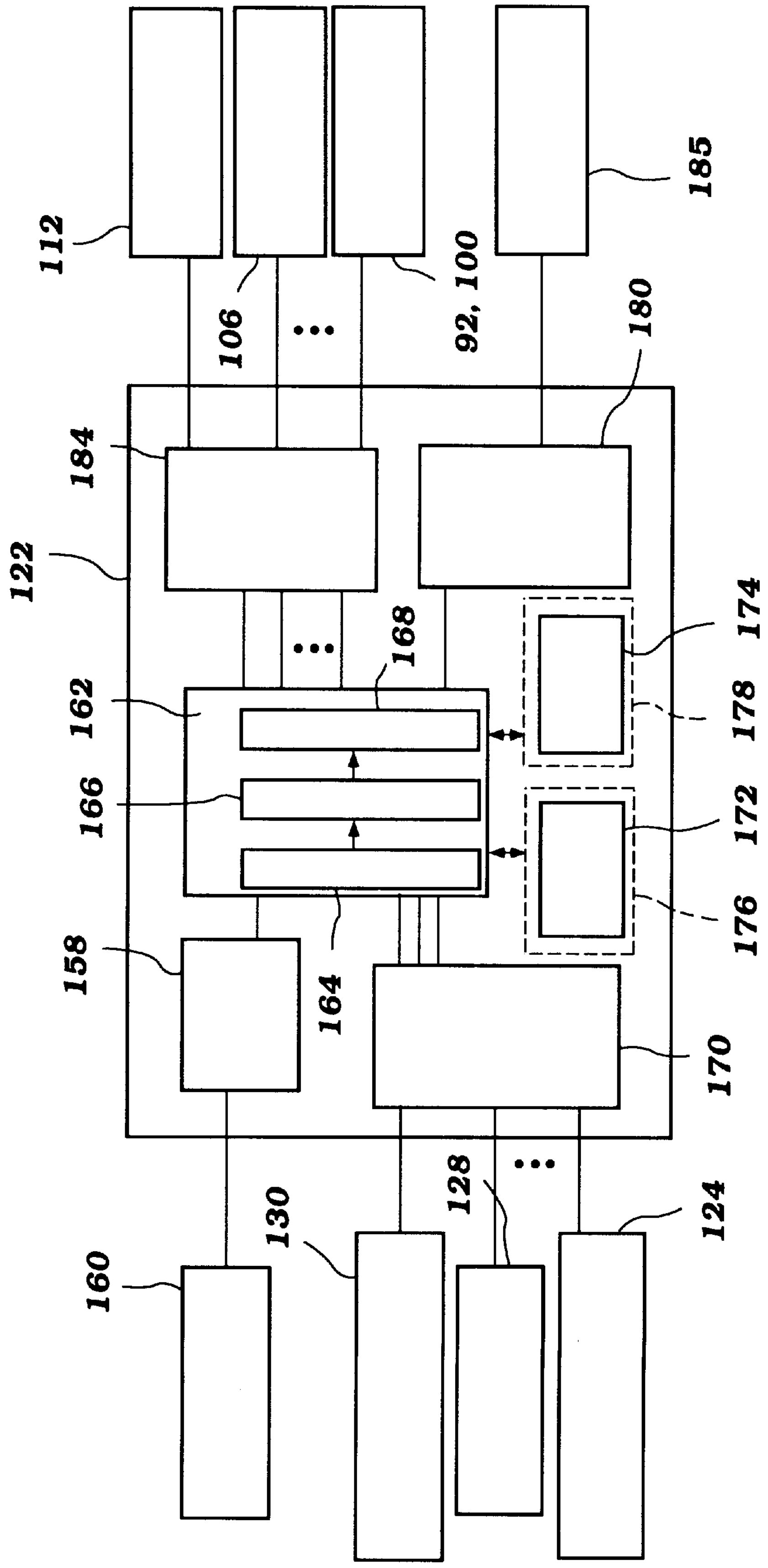
FIG. 3 is a schematic illustrating the control of the present invention.

FIG. 3 illustrates in more detail the arrangement of the ECU 122. As illustrated, the ECU 122 is powered through a power circuit 158 by a power source such as a battery 160, alternator or the like.

The ECU 122 includes a computer processing unit (CPU) 162. The CPU 162 includes an operational information input means 164, operational information write or store means 166, and operational information read or output means 168.

Output from the various sensors, such as the throttle angle sensor 130, intake air temperature sensor 128 and engine temperature sensor 124, is fed to the input means 164 of the CPU 162 through an input interface 170. The CPU 162 is arranged to write information to and read information from a means for storing data. Preferably, this means comprises first and second memory means 172,174. The first memory means 172 comprises an $E^2$PROM 176, while the second memory means 174 comprises an abnormal information memory means 178.

The CPU 162 includes a communications interface 180. Information read from the memory means 172, 174 by the read means 168 is output through this interface 180 to a display 182. In addition, the CPU 162 includes an output interface 184 through which control signals for controlling the various engine/motor features are set, such as control signals for firing spark plugs 112 and powering the fuel injector 106 and fuel pumps 92,100.

The control of the present invention is arranged to obtain input information from the various sensors, write or store this information in memory, and read the stored information.

Figure 4:
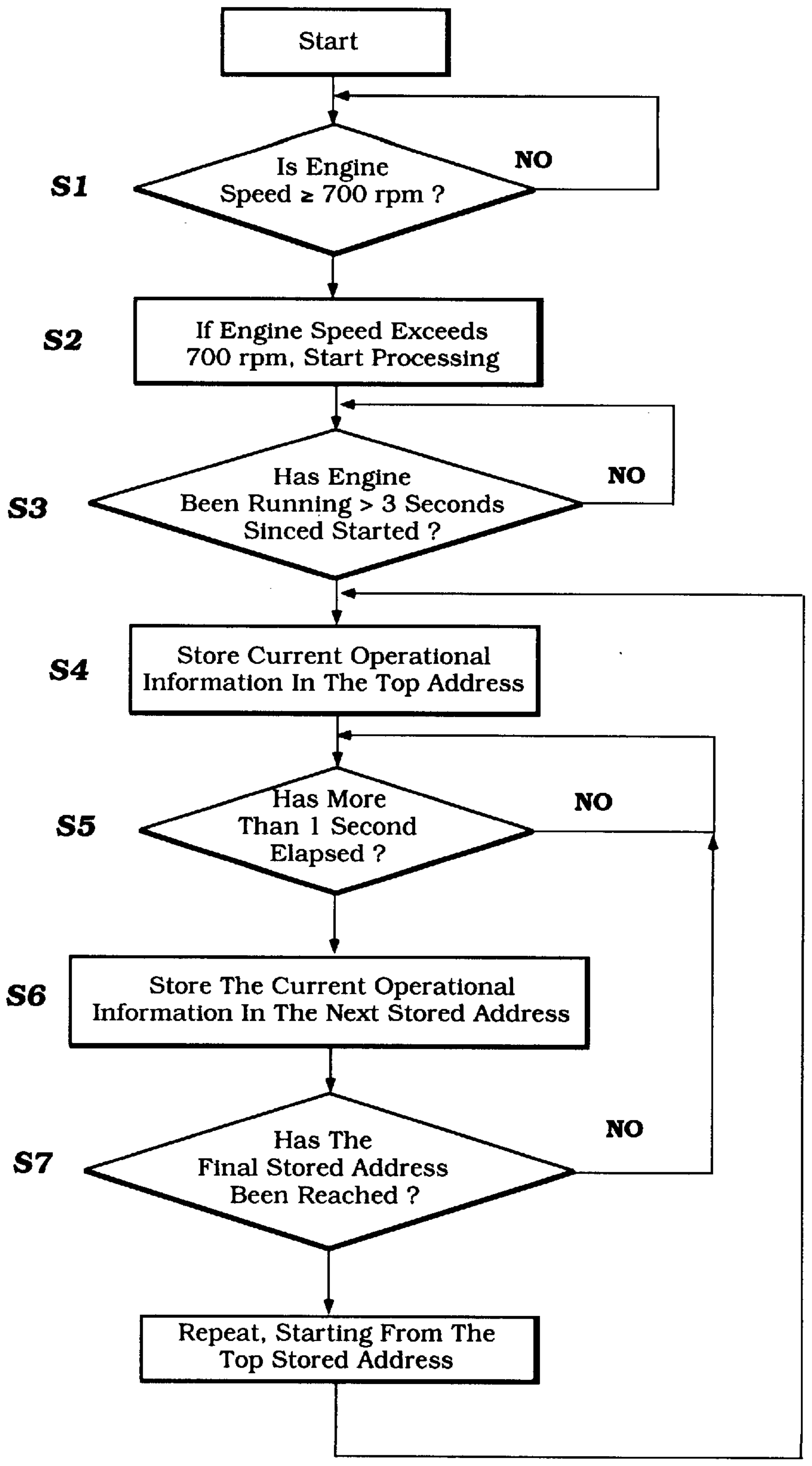
FIG. 4 is a flowchart illustrating a storing function of the control of the present invention.

FIG. 4 illustrates a flowchart governing the write or store function of the control. After the engine 22 has been started and in a step S1, it is determined whether the engine speed is equal to or greater than a preset speed, such as 700 rpm. The engine speed is checked until it reaches or exceeds this speed, and then the CPU 166 begins processing of inputted information in step S2.

In a step S3, the CPU 166 checks to determine if the engine 22 has been running for a predetermined amount of time, such as 3 seconds. If so, in a step S4, the CPU 166 stores the current operating information as obtained from the sensors through the input interface 170 and input means 164, such as the throttle angle, engine temperature and intake air temperature sensors 139,124,128. As indicated, this information is preferably stored in the top or first address or register of the first memory means 172.

In a step S5, the CPU 166 checks to determine if a predetermined amount of time has passed, such as 1 second. If so, the CPU 166 stores or writes the next set of operational data in sequential fashion to the next from the top or second address of the first memory means 172.

In a step S6, the CPU 166 checks to determine if the last set of operational data was written to the bottom or last address or register of the first memory means 172. If not, the CPU 166 checks in step S5 to determine if the predetermined amount of time has passed and then writes the next set of operational data to the next address or register.

If in step S7 the CPU 166 determines that the last set of operational data was written to the bottom or last address, the CPU 166 stores or "overwrites" the next set of operational data to the first or top address. Thereafter the process repeats itself.

Figure 5:
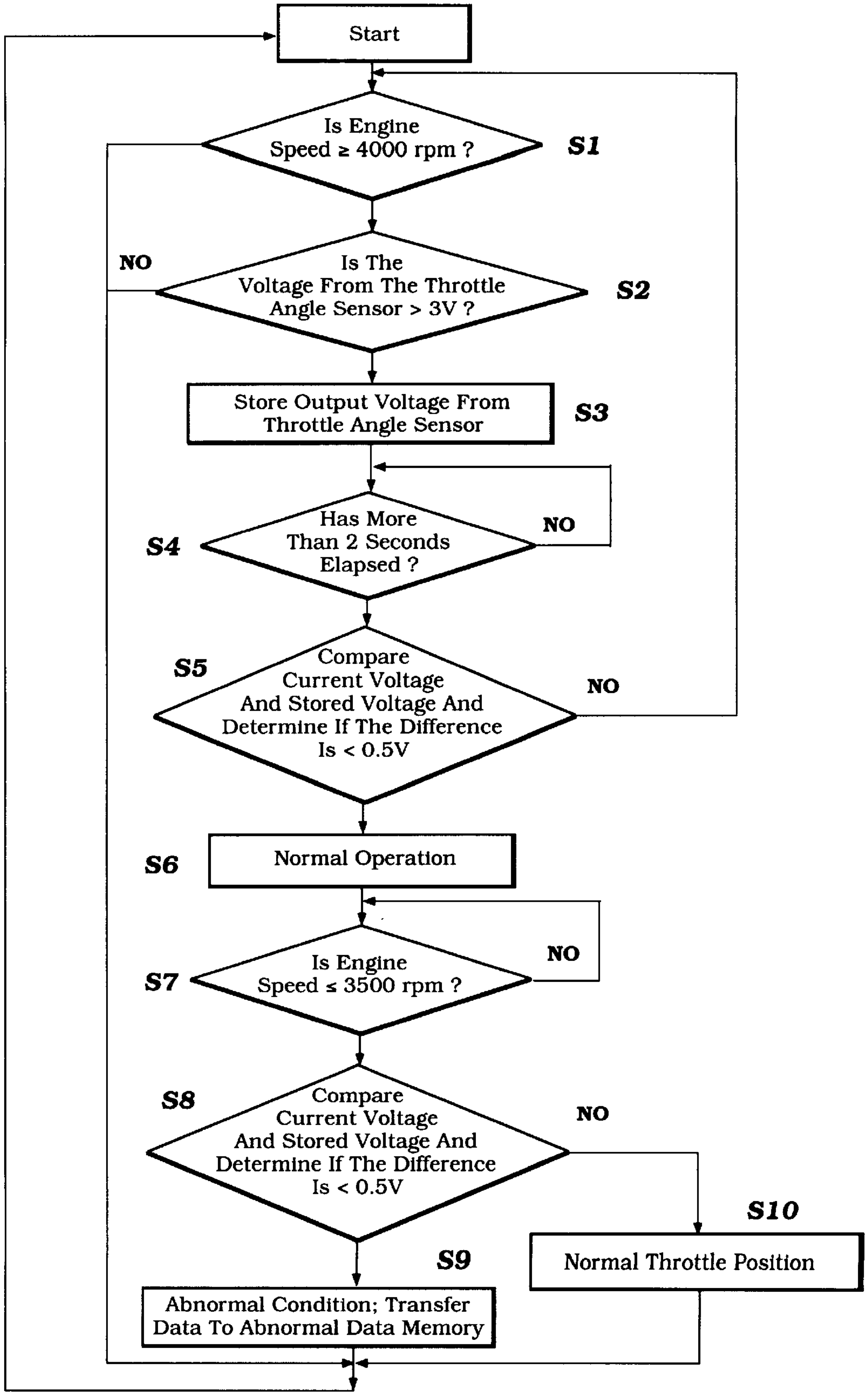
FIG. 5 is a flowchart illustrating a transfer function of the control of the present invention.

FIG. 5 is a flowchart illustrating a transfer function of the CPU 166. Once the engine 22 is started, and in a step S1, it is determined if the speed of the engine is at or above a predetermined speed such as 4000 rpm. If so, in a step S2, the CPU 166 checks to determine if the throttle valve 80 is opened beyond a predetermined angle, such as by checking the voltage output from the throttle angle or position sensor to determine if the output is equal to or greater than a predetermined amount, such as 3 volts.

If so, the output value from the throttle angle sensor 130 is stored in a step S3. The CPU 166 then waits for a predetermined time, such as 2 seconds in a step S4. After this time has elapsed, in a step S5 the current voltage or other output from the throttle position sensor 130 is compared against the stored voltage and it is determined if the difference is less than 0.5 volts.

If not, then the process starting at step S1 is repeated. If the difference is greater than 0.5 volts, then in a step S6 it is determined that a normal operation is being employed. In a next step S7, the CPU 166 determines if the engine speed is equal to or less than 3500 rpm. When the engine speed is in this range, in a step S8 the current voltage or other output from the throttle angle sensor 130 is again checked against the stored voltage or output.

If the voltage difference is greater than 0.5 volts, then in a step S10 it is determined that the throttle has moved to the appropriate position and the process repeats. On the other hand, if the voltage difference is less than 0.5 volts, then it is determined in a step S9 that there is an abnormal condition associated with the motor 20, and more particularly the engine 22, and the operational information from the various sensors is transferred to the abnormal operational information memory 178 (into the second memory means 174) from the first memory means 172. In particular, it may be seen that if the engine speed has dropped from 4000 to 3500 rpm and the throttle valve 80 has not moved by an appropriate corresponding amount, it means that the engine speed is dropping generally as a result of an abnormality (i.e., something unrelated to a desired engine speed change effectuated by a change in throttle valve angle).

In accordance with the control of the present invention the control 122 is arranged so that only a small memory is required. In particular, since the memory is arranged so that the oldest information is overwritten by the newest in sequential fashion, the memory always contains information from the sensors over a period of time which can be compared. At the same time, however, the memory may be much smaller than if the memory was stored in bulk.

In addition, the control 122 of the present invention is arranged to continuously monitor for an abnormal condition associated with the motor 20 and, in the event of such a condition, update the abnormal condition memory with the newest abnormal condition operational data.

While the control has been described for use with an engine powering an outboard motor, those of skill in the art will appreciate that the control may be used in other applications. For example, the control may be used with an in-board mounted engine associated with a propulsion unit of a watercraft.

Of course, the foregoing description is that of preferred embodiments of the invention, and various changes and modifications may be made without departing from the spirit and scope of the invention, as defined by the appended claims.

What is claimed is:

1. A control for a propulsion unit for a watercraft, said unit powered by an internal combustion engine and including at least one sensor for providing data regarding a condition of said propulsion unit, said control including input means for accepting said data from said sensor, memory means for storing said data, said memory means having a first data position and a last data position, means for reading data from said memory means, and means for storing said data obtained from said input means to said memory means sequentially to said first and then said last data position and to then repeat said sequence of storing after said last data position is filled.

2. The control in accordance with claim 1, wherein said means for storing stores data obtained from said input means at fixed time intervals.

3. The control in accordance with claim 1, wherein said engine includes an air intake system having a throttle valve and said at least one sensor includes a throttle valve position sensor.

4. The control in accordance with claim 1, including display means for displaying information output from said means for reading data.

5. The control in accordance with claim 1, wherein said control includes means for detecting an abnormality associated with said propulsion unit from said data obtained from said at least one sensor.

6. The control in accordance with claim 5, wherein said control includes an abnormal memory means and means for storing data to said abnormal memory means after an abnormality is identified.

7. The control in accordance with claim 5, wherein said engine includes an air intake having a throttle valve movably positioned therein, a throttle position sensor for providing throttle position data and an engine speed sensor for providing engine speed data, and wherein said abnormal condition is identified when said engine speed exceeds a certain speed and said throttle valve is moved beyond a certain position and said engine speed then falls below a preset speed without said throttle valve moving by a preset amount.

8. The control in accordance with claim 1, wherein the memory means has more than two data positions and said means for storing stores data sequentially to each of said data positions.

9. A method for controlling a propulsion unit powered by an internal combustion engine, said propulsion unit having at least one sensor associated therewith which provides data regarding a condition of said propulsion unit, the propulsion unit including a memory having at least a first and a second data register, comprising the steps of obtaining data from said sensor, inputting said data to said first register of said memory, inputting data to said second register of said data and then overwriting said data in said first register and then said second register if additional information is to be stored, and reading said data from said memory.

10. The method in accordance with claim 9, further including the step of outputting said data read from said memory.

11. The method in accordance with claim 9, further including the step of displaying said data read from said memory.

12. The method in accordance with claim 9, wherein said control includes an abnormal memory and including the step of determining if an abnormal condition exists and if so, storing said data to said abnormal memory.

* * * * *